United States Patent Office 3,466,362
Patented Sept. 9, 1969

3,466,362
WATER-DISPERSIBLE, MEDICAMENT-CONTAIN-
ING COMPOSITIONS USEFUL AS VETERINARY
MEDICINES
Heinrich Kläui, Riehen, Walter Rehm, Basel, and Wolf-
gang Schlegel, Riehen, Switzerland, assignors to Hoff-
mann-La Roche Inc., Nutley, N.J., a corporation of New
Jersey
No Drawing. Filed May 13, 1965, Ser. No. 455,582
Claims priority, application Switzerland, May 22, 1964,
6,732/64
Int. Cl. A61k 21/00, 27/00
U.S. Cl. 424—14       7 Claims

ABSTRACT OF THE DISCLOSURE

Water-dispersible compositions in the form of finely divided particles, the major portion of which particles have a diameter of between about 50 and 2,000μ are described, such compositions containing (a) an active medicament, (b) a polyethylene glycol which is solid at normal room temperatures and (c) an amphiphilic agent which is solid at normal room temperatures selected from the group consisting of higher fatty alcohols, higher fatty acids and monoglycerides of higher fatty acids.

This invention relates, in general, to a therapeutic composition. More particularly, the invention relates to water-dispersible, medicament-containing compositions which are useful as veterinary medicines.

For many years it has been recognized that a need exists for veterinary medicines which are suitable for oral administration. The unpleasant taste of certain drugs has, however, lessened their value as oral veterinary medicaments. For example, the extremely valuable sulfonamides, which in veterinary medicine are used, ordinarily, in the form of a water-soluble sodium salt, cannot be administered successfully as an adjunct to the drinking water of sick animals because they impart to the water an extremely unpleasant taste.

In the recent past it was the custom to formulate medicaments of this nature into aqueous suspensions and to administer such suspensions to the animal from a suitable flask. Adiminstration of the medicament in this manner ordinarily required the attendance of at least two persons, or more depending upon the size and/or temperament of the animal to be treated. With the subsequent development of the nose-throat probe, it became possible to deliver the medicament directly to the stomach of the animal. For the most part, this type of administration produced a rapid onset of action by the medicine. However, it is not devoid of disadvantages, since the technique requires the attendance of a veterinary surgeon, assisted by at least one other person.

Attempts to administer unpleasant tasting medicines, admixed with the feed of a sick animals, have, for the most part, proven to be unsatisfactory since, when ill, the feed intake of the animal is generally reduced. On the other hand, where the illness is accompanied with a fever, the thirst of the animal is much greater. Thus, the animal will drink liquids, providing, however, that the liquids are not unpleasant tasting.

It is well known that, in the case of swine, the oral administration of unpleasant tasting medicines, as an adjunt to their drinking water, is practically impossible. Swine will accept an unpleasant tasting medicine only when the medicament is delivered in the form of a confection consisting, ordinarily, of a mixture of the medicine and jam. Generally, a confection of this nature is smeared on the tongue of the animal with the operation frequently requiring the attendance of several persons to hold the anmial steady.

It has long been recognized that the taste of unpleasant tasting medicines can be masked by various techniques. These techniques generally involve the formulation of compositions which are either not dispersible in water, or dispersible in water only with great difficulty, and which have greatly delayed resorbability characteristics. In the compositions described hereinafter, such properties are neither present nor desired.

In its broadest embodiment, the present invention provides improvements in veterinary medicines.

In a more limited embodiment, the invention provides water-dispersible, rapidly resorbable veterinary medicine preparations, in the form of finely divided, practically tasteless particles, which, when added to the drinking water of animals, imparts no unpleasant taste thereto.

The compositions of this invention contain, as the essential ingredients thereof, (a) up to about 50% by weight of an active medicament, (b) from about 2% to about 70% by weight of a polyethylene glycol which is solid at normal room temperatures and (c) from about 10% to about 70% by weight of an amphiphilic agent which is solid at normal room temperatures, said compositions being provided in the form of finely divided particles the major portion of which have a diameter of between about 50 and 2000μ. The compositions which are produced in the prefered embodiment of the invention contain, however, from about 5% to about 70% by weight of the polyethylene glycol component.

The compositions of this invention are readily prepared. In a preferred embodiment of the invention, the compositions are obtained by mixing the heretofore named essential ingredients at a temperature above the melting point of the polyethylene glycol and amphiphilic agent and, subsequently, converting such mixture into particles of desired size. Conversion of the mixture into particles can be accomplished by any one of several methods. In one such method, the mixture can be allowed to solidify by cooling and, subsequently, the solidified product is reduced to small particles by appropriate means, for example, by roller cooling. In the alternative, the molten mass can be sprayed into fine droplets which are allowed to solidify into discrete particles.

From the foregoing, it will be appreciated that the present invention provides an economical and practical means for delivering to sick animals valuable medicines which, in and of themselves, are unpleasant tasting. Thus, by means of this invention it is possible to formulate active medicament materials, which cannot be administered to animals orally or which are administerable orally to animals only with great difficulty, into compositions that can be added to the drinking water or milk of animals without imparting an unpleasant taste thereto. Additionally, however, the invention can be utilized as a means of administering drugs which have an unpleasant aroma; or which irritate the mucous membrane; or which are susceptible to oxidation; or which are light sensitive.

In general, the present invention comprehends the use of any active medicament which cannot be administered to animals orally or which can be administered orally to animals only with great difficulty. Included among the active medicaments which are employed in the practice of this invention are sulphonamides, such as, sulfisoxazole, i.e., 3,4-dimethyl-5-sulfanilamidoisoxazole, sulfadimethoxine, i.e., 2,4-dimethoxy-6-sulfanilamido-1,3-diazine, 5-methyl-3-sulfanilamidoisoxazole, 5-methoxy - 2 - sulfanilamido-1,3-diazine; antibiotics, such as, chloramphenicol, i.e., D-(-)threo-2,2-dichloro-N-[β-hydroxy-α - (hydroxymethyl)-p-nitrophenethyl]acetamide, neomycin, etc.; and other drubs, such as, chlorprothixene, i.e., 2-chloro-9-(3-dimethylaminopropylidene)thioxanthene; chloridazepoxide, i.e., 7-chloro-2-methylamino-5-phenyl-3H - 1,4 - benzodiazepine 4-oxide; diazepam, i.e., 7-chloro-1-methyl-5-phenyl - 3H - 1,4 - benzodiazepin - 2(1H) - one; chloropromaozine, i.e., 2-chloro-10-(3 - dimethylaminopropyl)-phenothiazine; aminophenazone, i.e., 4 - dimethylamino-2,3-dimethyl-1-phenyl-3-pyrazolin-5-one; salicylates; barbiturates; Chrysazin, i.e., 1,8 - dihydroxyanthraquinone; chloral hydrate; hexamethylenetetramine; plant extracts or plant drugs, such as quinine, caffeine, opiates, aloe, kamala, croton oil, arecoline; as well as iron, arsenic, mercury and other metal-containing preparations and vitamin compositions.

The quantity of active medicament which is incorporated into the compositions of this invention is variable within rather wide limits. In general, the amount of active material which is used in any given instance will depend upon the degree of pharmaceutical activity possessed by the active medicament in use and the dosage of that medicament required in the final product. Thus, insofar as the lower limit is concerned, a sufficient quantity of medicament will be employed to provide a therapeutically useful end product. The foregoing factors must be taken into consideration also in determining the maximum quantity of drug to be incorporated into any particular product. Additionally, technical factors must be considered. If too large a quantity of the active component is used, the physical characteristics of the product, i.e., its taste, water-dispersibility, etc. could be adversely effected. Under ordinary circumstances, however, the amount of the active medicament substance which is present in the dry powdery products of this invention will not exceed about 50% by weight of the composition.

The present invention encompasses the use of active medicament materials which are either solid or liquids. Where, however, the active material is a liquid, it has been found to be most convenient to use these medicaments, adsorbed on solid carriers such as lactose, silicic acid, starch, etc.

The polyethylene glycols which are used in the practice of this invention are, as indicated heretofore, solid at normal room temperatures. Among the polyethylene glycols which are suitable for use are polyethylene glycol-2000, polyethylene glycol-4000, polyethylene glycol-6000 and polyethylene glycol-10,000. Such glycols can be used alone or in a mixture with each other or in a mixture with polyethylene glycols having a higher molecular weight. The polyethylene glycol component comprises from about 2% to about 70% by weight, and, preferably, from about 5% to about 70% by weight of the product in particulate form.

The amphiphilic agents which are used in carrying out this invention are also compounds which are solid at normal room temperatures. Exemplary of the ampiphilic agents which are employed herein are, for example, monoglycerides of higher fatty acids, such as, glyceryl monostearate; mixtures of monoglycerides and diglycerides of higher fatty acids, such as, a mixture of glyceryl monostearate and glyceryl distearate; higher fatty alcohols, such as, cetyl alcohol, stearyl alcohol, etc.; higher fatty acids, such as, palmitic acid, stearic acid, etc.; and higher fatty amides, such as, stearic acid amide, stearic acid ethanolamide, etc. The amphiphilic agent comprises from about 10% to about 70% by weight of the final product.

In addition to the essential components enumerated heretofore, the powdery products of this invention can contain the usual excipients, fillers and aroma-imparting materials which are customarily used in formulating conventional pharmaceutical compositions. Furthermore, it may at times be expedient to add to the predominantly lipophilic mixture a small amount of a known wetting agent, such as, soap, a non-ionic emulsifier of the polyglycol type, to improve the wettability characteristics of the particles produced therefrom.

This invention should be carried out in such a manner as to provide the final product in the form of discrete particles a major portion of which have diameters falling within the range of between $50\mu$ and $2000\mu$. It has been found that when a substantial portion of the product is made up of particles which are smaller in size than the minimum limit prescribed herein, premature liberation of the active medicament occurs. On the other hand, where a substantial portion of the product is made up of particles which are larger in size than the maximum limit prescribed herein, the dispersibility of the preparation, either in water or milk, is adversely effected.

The manner in which the powdery products of this invention are used will be readily apparent to persons skilled in the art. In general, the powders are dispersed in some suitable liquid vehicle, for example, drinking water, milk, etc., and the dispersions are made available to the animal for drinking. The formulation of the powdery products of this invention into the desired liquid dispersions is readily accomplished. The technique which is employed involves merely the addition of the medicament-containing powder into cold or lukewarm water or into milk and thoroughly stirring same therein. Incorporation of the present products into the liquid vehicles imparts no unpleasant taste to the vehicles during the time ordinarily needed for the administration of the product, which under ordinary circumstances will not exceed about thirty minutes. On the other hand, the active medicament of the product is liberated rapidly after intake by the animal.

The present invention makes it possible to deliver unpleasant tasting medicines to animals in the form of a palatable drink. The acceptability of the drink can be further improved by adding a suitable flavor-departing adjuvant material. However, the use of such an adjuvant is not necessary. Many other advantages flow from the practice of this invention. For example, since the products are powders, they are easily handled. Furthermore, since they are dispersible in water, they can be delivered to the animal in vehicles not foreign to their ordinary diet. Moreover, administration of the medicine does not require the continuous presence of technically trained personnel. A particular advantage of the present invention resides in the fact that, by administering the medicament in drinking water, especially when glucose or milk is added thereto, there is effected a release of the so-called throat-drip reflex in cattle, so that the medicament, by-passing the omasum, proceeds directly to the fourth stomach. Under such circumstances, rapid resorption is assured and the disadvantageous action of some chemotherapeutics on the flora of the first stomach is avoided. Additionally, since the liquid preparations do not have an unpleasant taste, the possibility is virtually eliminated that the animal willl expectorate the drink, and, hence, the medicament therein, as it proceeds into the region of the taste organs on rumination.

EXAMPLE 1

In this example, 25 parts by weight of finely powdered sulphadimethoxine were stirred into a heated molten mixture of 25 parts by weight of polyethylene glycol-4000 and 49 parts by weight of glyceryl monostearate. To the resulting suspension there was added 0.5 part by weight of a mixture of volatile oils from rosemary, sage, fennel and thyme, following which the suspension was converted, by spray-congealing, into a free-flowing powder the particles of which ranged in size between about 100 and $500\mu$. By dusting with 0.5 part by weight of tricalcium phosphate, the flowability of the powder was increased.

50 grams of the powdery product thus produced was added to, and stirred in, 4 liters of water and the liquid preparation was put out for a 500 kg. weight ox to rink. The liquid was taken by the animal with no apparent reluctance.

A liquid preparation was prepared as described in the preceding paragraph using milk as the vehicle in place of water. The milk preparation was taken by the animal without any visible manifestation that the preparation had an unpleasant taste.

EXAMPLE 2

In this example, 25 parts by weight of finely powdered 5-methyl-3-sulphanilamidoisoxazole were stirred into a heated molten mixture of 22.5 parts by weight of polyethylene glycol-4000 and 52.5 parts by weight of glyceryl monostearate. The mixture was thoroughly stirred and there was added thereto 0.5 part by weight of a mixture of volatile oils from rosemary, sage, fennel and thyme. Thereafter, the suspension was converted, by spray-congealing, into a freely flowing powder the particles of which ranged in size between about 100 and 500μ.

40 grams of powdery product, produced as described in the preceding paragraph, were stirred into about 4 liters of water and put out for a 200 kg. weight bullock to drink. From the fact that the liquid preparation was taken by the animal without any reluctance, it is concluded that the preparation was completely palatable and devoid of an unpleasant taste.

A second liquid preparation was prepared as described in the preceding paragraph using milk, rather than water, as the liquid vehicle. The animal showed no reluctance to drink the product, indicating that it was completely palatable and devoid of an unpleasant taste.

EXAMPLE 3

In this example, 20 parts by weight of finely powdered 5-methyl-3-sulphanilamidoisoxazole and 9 parts by weight of ground cooking salt were introduced into a molten mixture of 50 parts by weight of polyethylene glycol-6000 and 20 parts by weight of stearyl alcohol. After the addition of 0.1 part by weight of a mixture of volatile oils, the molten mixture was converted into a flowing powder by spray-congealing, yielding particles which ranged in size between about 100 and 500μ.

75 grams of the powdery product produced as described in the preceding paragraph was stirred into about 3 liters of skimmed milk and the liquid preparation was put out for a 150 kg. weight mother sow to drink. During this treatment, the animal was fed only with dry fodder. It was observed that the sow drank the liquid preparation without any reluctance, indicating its palatability and the absence therein of any unpleasant taste.

EXAMPLE 4

In this example, 30 parts by weight of finely powdered chlorprothixene were introduced into a molten mixture of 30 parts by weight of polyethylene glycol-4000 and 35 parts by weight of palmitic acid. After the addition of 5 parts by weight of lactose, the molten mixture was converted into a flowing powder by spraying onto a cooled roller, the resulting powder having a granule size under 500μ.

5 grams of the powdery product, produced as described in the preceding paragraph, was added to, and stirred into, about 4 liters of water. The liquid preparation was put out for a 500 kg. weight horse to drink. The horse had taken no liquid during the previous 12 hour period. The horse drank the liquid without reluctance, indicating that it was palatable and devoid of unpleasant taste.

EXAMPLE 5

In this example, 30 parts by weight of fine powdered chlordiazepoxide were added to, and stirred in, a molten mixture of 25 parts by weight of glyceryl monostearate, 20 parts by weight of palmitic acid and 25 parts by weight of polyethylene glycol-4000. After the addition of 0.5 part by weight of volatile oils of rosemary and sage and 4 parts by weight of ground cooking salt, the molten mixture was poured onto thin plates. After solidification, the product was converted, by mechanical means with a crusher, into a powder having a granule size under 500μ.

One gram of the powdery product, produced as described in the previous paragraph was added to, and stirred in 0.5 liter of sweet skimmed milk and put out for a 100 kg. weight pig to drink. The animal showed no reluctance to drink the liquid, indicating that it was palatable and devoid of an unpleasant taste.

EXAMPLE 6

In this example, 25 parts by weight of 1,4-bis-trichloromethylbenzene was added to a molten mixture of 70 parts by weight of palmitic acid, 2 parts by weight of polyethylene glycol-4000 and 1 part by weight of diethanolamine. To this molten mixture there was added 0.5 part by weight of a perfume material, following which the molten mixture was converted, by spraying, to fine particles having a diameter in the range between about 100 and 500μ. The flowability of the powder obtained by this method was improved by the addition thereto of 1.5 parts bf weight of tricalcium phosphate.

A liquid preparation was prepared by dispersing 35 grams of the powdery product, produced as described in the preceding paragraph, in 1 liter of water. The liquid preparation thus obtained was put out for a 50 kg. weight sheep to drink. The liquid was taken by the animal with no apparent reluctance indicating that the preparation was completely palatable and totally devoid of any unpleasant taste.

We claim:

1. A water dispersible therapeutically active veterinary composition comprising (a) a sufficient quantity to provide a therapeutically useful end product up to about 50 percent by weight of an unpleasant tasting therapeutically active substance, (b) from about 2 percent to above 70 percent by weight of a polyethylene glycol which is solid at normal room temperatures and (c) from about 10 percent to about 70 percent by weight of an amphiphilic agent which is solid at normal room temperatures, selected from the group consisting of higher fatty alcohols, higher fatty acids and monoglycerides of higher fatty acids, said composition being in the form of discrete particles, the major portion of which have diameters within the range of from about 50μ to 2000μ.

2. A water-dispersible, therapeutically active veterinary composition comprising (a) a sufficient quantity to provide a therapeutically useful end product up to about 50% by weight of sulfadimethoxine, (b) from about 5% to about 70% by weight of a polyethylene glycol which is solid at normal room temperatures and (c) from about 10% to about 70% by weight of glyceryl monostearate, said composition being in the form of discrete particles, the major portion of which have diameters within the range of from about 50μ to 2000μ.

3. A water-dispersible, therapeutically active veterinary composition comprising (a) a sufficient quantity to provide a therapeutically useful end product up to about 50% by weight of 5-methyl-3-sulfanilamidoisoxazole, (b) from about 5% to about 70% by weight of a polyethylene glycol which is solid at normal room temperatures and (c) from about 10% to about 70% by weight of glyceryl monostearate, said composition being in the form of discrete particles, the major portion of which have diameters within the range of from about 50μ to 2000μ.

4. A water-dispersible, therapeutically active veterinary composition comprising (a) a sufficient quantity to provide a therapeutically useful end product up to about 50% by weight of 5-methyl-3-sulfanilamidoisoxazole, (b) from about 5% to about 70% by weight of a polyethylene glycol which is solid at normal room temperatures and (c) from about 10% to about 70% by weight of stearyl alcohol, said composition being in the form of discrete particles, the major portion of which have diameters within the range of from about 50μ to 2000μ.

5. A water-dispersible, therapeutically active veterinary composition comprising (a) a sufficient quantity to provide a therapeutically useful end product up to about 50% by weight of chlorprothixene (b) from about 5% to about 70% by weight of a polyethylene glycol which is solid at normal room temperatures and (c) from about 10% to about 70% by weight of palmitic acid, said composition being in the form of discrete particles the major portion of which have diameters within the range of from about 50µ to 2000µ.

6. A water-dispersible, therapeutically active veterinary composition comprising (a) a sufficient quantity to provide a therapeutically useful end product up to about 50% by weight of chlordiazepoxide, (b) from about 5% to about 70% by weight of a polyethylene glycol which is solid at normal room temperatures and (c) from about 10% to about 70% by weight of a mixture of glyceryl monostearate and palmitic acid, said composition being in the form of discrete particles the major portion of which have diameters within the range of from about 50µ to 2000µ.

7. A water-dispersible, therapeutically active veterinary composition comprising (a) a sufficient quantity to provide a therapeutically useful end product up to about 50% by weight of 1,4-bis-trichloromethyl benzene, (b) from about 5% to about 70% by weight of a polyethylene glycol which is solid at normal room temperatures and (c) from about 10% to about 70% by weight of palmitic acid, said composition being in the form of discrete particles the major portion of which have diameters within the range of from about 50µ to 2000µ.

References Cited

UNITED STATES PATENTS

| | | | |
|---|---|---|---|
| 3,096,248 | 7/1963 | Rudzki | 167—82.9 |
| 3,244,595 | 4/1966 | Feigh | 167—82.9 |
| 3,170,836 | 2/1965 | Vergine | 167—53 |
| 3,139,383 | 6/1964 | Neville | 167—82.9 |
| 3,184,386 | 5/1965 | Stephenson | 167—82.9 |
| 3,108,046 | 10/1963 | Harbit | 167—82.9 |

FRANK CACCIAPAGLIA, JR., Primary Examiner

U.S. Cl. X.R.

424—224, 229, 275, 353